(12) United States Patent
Arai et al.

(10) Patent No.: US 8,924,496 B1
(45) Date of Patent: Dec. 30, 2014

(54) TRACKING THE VIRALITY OF USER ACTIONS

(71) Applicant: LinkedIn Corporation, Mountain View, CA (US)

(72) Inventors: Benjamin T. Arai, Sunnyvale, CA (US); Simla Ceyhan, Mountain View, CA (US); Balachander Ganapathy Subramaniam, Mountain View, CA (US); Ron Bekkerman, Mountain View, CA (US); Manu Sharma, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/954,788

(22) Filed: Jul. 30, 2013

(51) Int. Cl.
*G06F 15/16* (2006.01)
*G06F 15/173* (2006.01)

(52) U.S. Cl.
CPC ............................. *G06F 15/17306* (2013.01)
USPC ........................... 709/206; 709/219; 709/224

(58) Field of Classification Search
CPC .......... G06Q 30/0254; G06Q 30/0255; G06Q 30/0201
USPC .......... 709/204, 206, 217, 219, 223, 224, 250
See application file for complete search history.

(56) References Cited

U.S. PATENT DOCUMENTS

| 8,140,376 B2* | 3/2012 | Koonce et al. ............... 705/7.29 |
| 2011/0131095 A1* | 6/2011 | Soza et al. .................. 705/14.66 |
| 2012/0151322 A1* | 6/2012 | Lindsay et al. ............... 715/234 |
| 2012/0253918 A1* | 10/2012 | Marois et al. .............. 705/14.39 |
| 2012/0324008 A1* | 12/2012 | Werz et al. ..................... 709/204 |
| 2013/0030865 A1* | 1/2013 | Villaverde et al. ........... 705/7.29 |
| 2013/0055300 A1* | 2/2013 | Hanina ........................... 725/10 |
| 2013/0179511 A1* | 7/2013 | Stevens et al. ................ 709/204 |
| 2013/0346841 A1* | 12/2013 | Ahmed et al. ................ 715/208 |

\* cited by examiner

*Primary Examiner* — Viet Vu
(74) *Attorney, Agent, or Firm* — Park, Vaughan, Fleming & Dowler LLP; Steven E. Stupp (57) ABSTRACT

A technique for determining the impact of multiple users' actions is described. According to this technique, information specifying multiple users' actions is aggregated. This information includes linkages that indicate the initiators of the multiple users' actions. Then, the impacts of the multiple users' actions are determined based on the aggregated information. In particular, the impact of a given user's action includes a direct component performed by the given user and an indirect component performed by other users in a social graph in response to the given user's action, where the social graph includes relationships between the other users and the given user. For example, the multiple users' actions and the social graph may be associated with a website, and the determined impacts may allow traffic and/or revenue of the website to be increased.

18 Claims, 7 Drawing Sheets

TRACKING THE VIRALITY OF USER ACTIONS

BACKGROUND

1. Field

The described embodiments relate to techniques for tracking the virality of an individual's actions in a social graph. More specifically, the described embodiments relate to techniques for tracking the impact of an individual's actions on other individuals in a social graph associated with a website.

2. Related Art

Websites often determine a wide variety of user-action metrics to assess the interest of users in their content. For example, many websites determine: the number of users per day, the number of paid views, the number of clicks on advertising, etc.

While these user-action metrics provide information about user interest in the content, a significant portion of the user's interest is often missed by the user-action metrics. In particular, when a given user performs an action related to a website, there are often multiple subsequent actions that occur. Many of these actions are often performed by other individuals than the given user. Because these subsequent actions (which are sometimes referred to as 'downstream actions') are not tracked by existing user-action metrics, the interest of users in the content on websites is typically underestimated. These underestimates can: adversely affect decisions made based on the inaccurate estimates of user interest; result in incorrect assessments of the effective audience of the websites; and reduce the value of paid advertising on the websites.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for determining the impact of multiple users' actions, and a computer-program product (e.g., software) for use with the computer system are described. During this monitoring technique, information specifying multiple users' actions is aggregated. This information includes linkages that indicate the initiators of the multiple users' actions. Then, the impacts of the multiple users' actions are determined based on the aggregated information. In particular, the impact of a given user's action includes a direct component performed by the given user and an indirect component performed by other users in a social graph in response to the given user's action, where the social graph includes relationships between the other users and the given user.

Note that the multiple users' actions and the social graph may be associated with a website. By allowing the indirect component to be determined, this monitoring technique may allow user interest in the website (such as the effective audience of the website or the number of unique users) to be accurately estimated. These accurate estimates may be used to make improved decisions related to the website (such as layout and/or design decisions), which may allow the effective audience to increase. Consequently, the monitoring technique may increase the revenue and/or profitability of the website, for example, by increasing the value of paid advertising on the website.

In the discussion that follows, an individual, a user or a recipient of the content may include a person (for example, an existing customer, a new customer, a student, an employer, a supplier, a service provider, a vendor, a contractor, etc.). More generally, the monitoring technique may be used by an organization, a business and/or a government agency. Furthermore, a 'business' should be understood to include: for-profit corporations, non-profit corporations, groups (or cohorts) of individuals, sole proprietorships, government agencies, partnerships, etc.

Figure 1:
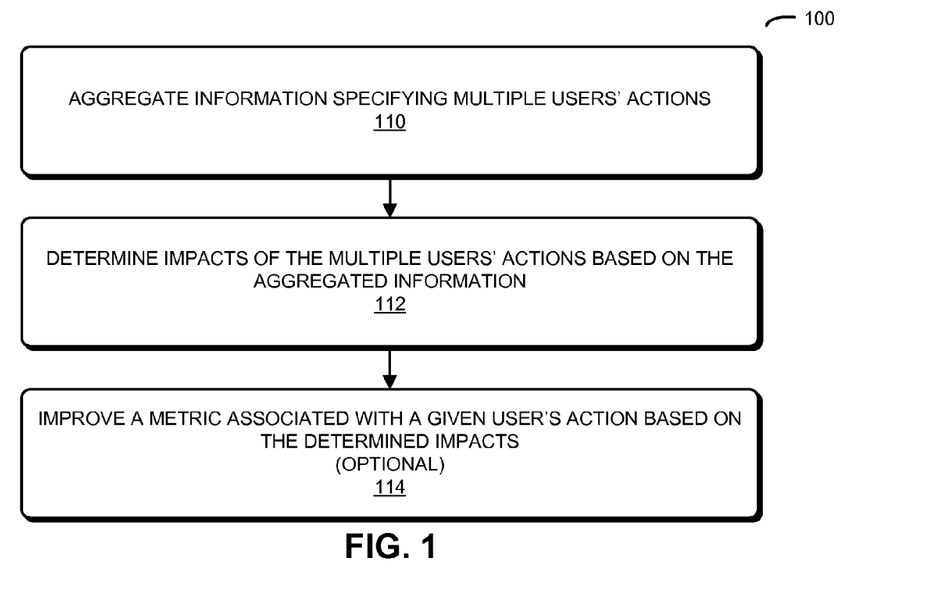
FIG. 1 is a flow chart illustrating a method for determining the impact of multiple users' actions in accordance with an embodiment of the present disclosure.

We now describe embodiments of the method. FIG. 1 presents a flow chart illustrating a method 100 for determining the impact of multiple users' actions, which may be performed by a computer system (such as computer system 700 in FIG. 7). During operation, the computer system aggregates information specifying the multiple users' actions (operation 110), where the information includes linkages that indicate the initiators of the multiple users' actions. For example, the multiple users' actions may be related to a website, such as clicks on links, sending or receiving emails, modifying content on the website, etc.

Then, the computer system determines the impacts of the multiple users' actions based on the aggregated information (operation 112), where the impact of a given user's action includes a direct component performed by the given user and an indirect component performed by other users in a social graph in response to the given user's action, and where the social graph includes relationships between the other users and the given user.

Note that the impact of the given user's action may be determined as a function of time following the given user's action. Moreover, at least some of the relationships precede the given user's action or may occur following the given user's action. For example, the given user may be connected to or may have a pre-existing relationship with one or more of the other users. However, in response to the given user's action, one or more of the other users may establish a connection or a relationship with the given user. In particular, the one or more of the other users may accept invitations to establish a connection or a relationship with the given user.

The direct component may include: an endorsement, an invitation to establish a relationship, an edit to a profile associated with a user or another user (such as a share, a like or a comment on the other user's profile), following an update to another user in the social graph, and/or following an update to an organization associated with another user in the social graph. (In the discussion that follows, note that these examples of the direct component are sometimes referred to as 'flows' or 'product flows' of information.)

The indirect component of the impact of the given user's action may include a sequence of subsequent events in the social graph after the given user's action, and may be modeled as a geometric series for the subsequent events having associated probabilities times a multiplicative factor. In particular, the multiplicative factor may correspond to a number of page views associated with an event in the sequence of subsequent events. More generally, the model may be a memory-less model.

Illustratively, the indirect component may correspond to, but is not limited to: a view of a document after the given user's action, a number of unique users of the social graph after the given user's action, a number of actions after the given user's action (such as invitations to connect in a social graph or profile edits), and/or revenue of a business associated with the social graph after the given user's action (such as revenue associated with clicks by the one or more of the other users on links for embedded advertising on or associated with a website after the given user's action).

In some embodiments, the computer system optionally improves a metric associated with the given users' actions based on the determined impacts (operation 114). Illustrative metrics may include: profit of a business associated with the social graph, flow of information among the users, and/or the indirect component. For example, based on the determined impacts, the layout of the website may be changed to increase the revenue and/or the profit associated with the website.

Figure 2:
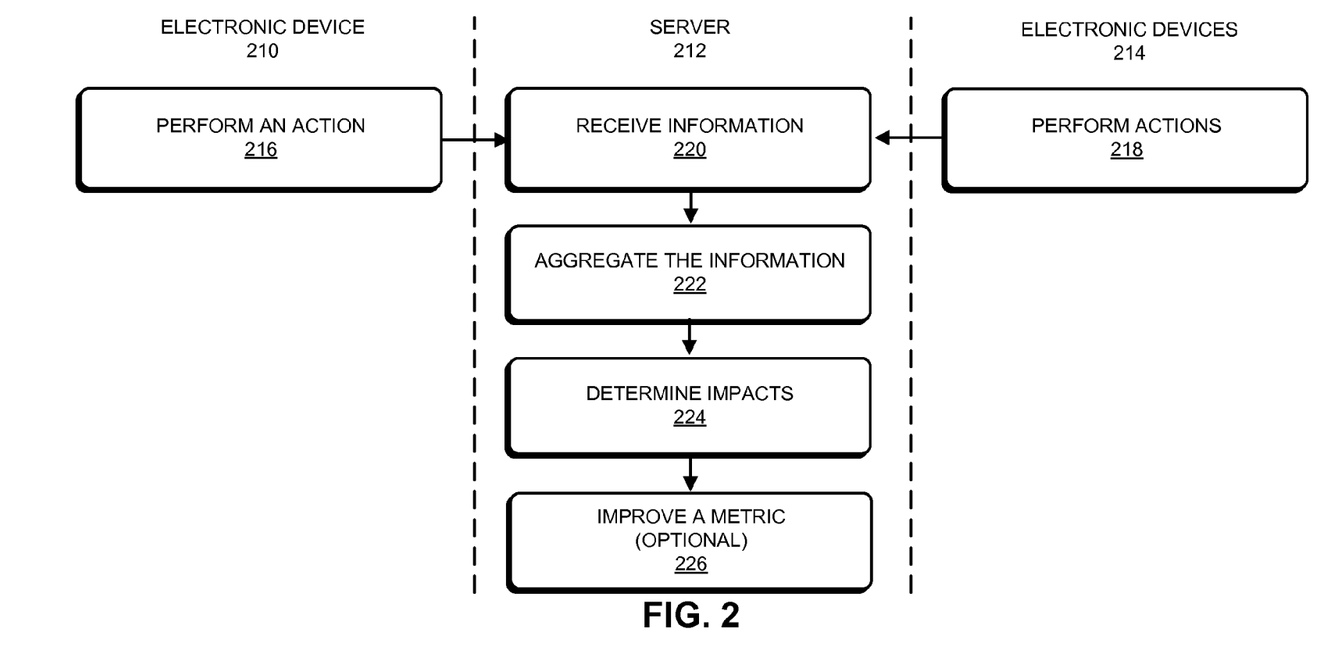
FIG. 2 is a flow chart further illustrating the method of FIG. 1 in accordance with an embodiment of the present disclosure.

In an exemplary embodiment, the monitoring technique is implemented using multiple electronic devices (such as a computer, a cellular telephone and/or a portable electronic device) and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of electronic device 210 may perform an action (operation 216). For example, the user may: endorse the skills of another user of a website (such as a social network, which can be described using a social graph), send a message (such as an email) to another user of the website inviting them to establish a relationship or connection with the user (which may be represented by the social graph), edit the user's or another user's profile on the website (which may summarize personal or professional attributes or skills, education, work experience, etc.), sign up on the website to follow professional or personal developments of another user of the website or an entity (such as an organization or a company) tracked by the website, and/or open a message (such as an email) that summarizes or updates the professional or personal developments (i.e., recent changes) of the other user of the website or the entity.

Moreover, users of other electronic devices 214 may perform (similar) actions (operations 218). These actions may be in response to the action in operation 216 or may be independent of the action in operation 216. For example, the users' actions in operations 218 may include a sequence of subsequent events in the social graph after the action in operation 216, such as a series of messages over time that are sent from one user to another user, and then to another user, etc., in response to the action. Collectively, the user's action in operation 216 and the users' actions in operations 218 may include: clicks on links associated with the website (such as links embedded in messages), sending or receiving messages associated with the website (such as invitation emails), modifying content on the website (such as content associated with a profile), etc.

Server 212 may receive information (operation 220) specifying the user's action in operation 216 and the users' actions in operations 218. This information includes linkages that indicate the initiators or origins of the users' actions in operations 218 that are related to the user's action in operation 216. For example, for those users' actions in operations 218 that are in response to the user's action in operation 216, the initiator or origin is the user's action in operation 216. More generally, the information includes linkages that indicate the initiators or origins of the users' actions in operations 218 that are related to other ones of the users' actions in operations 218.

Then, server 212 may aggregate this information (operation 222).

Next, server 212 determines the impacts (operation 224) of the user's action in operation 216 and/or the multiple users' actions in operations 218 based on the aggregated information. The impact of a given user's action (such as the action in operation 216) includes the direct component performed by the given user (in this case, in operation 216) and the indirect component performed by other users in operations 218 in response to the given user's action.

While the direct component of the impact may be determined by monitoring the user's action in operation 216, determining the indirect component may involve analyzing the aggregated information based on the linkages to follow the sequences of subsequent actions that occur in the social graph in response to the user's action in operation 216. In particular, the indirect component may correspond to (i.e., may be related to or a function of): one or more views of a document (such as a web page with a profile) after the user's action in operation 216, a number of unique users of the social graph after the user's action in operation 216, a number of actions after the given user's action in operation 216, and/or revenue of a business associated with the social graph (such as that of a provider of the website) after the user's action in operation 216 (such as revenue associated with embedded advertising on the website or user payments to the website for services).

In some embodiments, server 212 optionally improves a metric (operation 226) associated with the users' actions in operations 218 based on the determined impacts. For example, server 212 may: change a layout of the website (and, more generally, the way information on the website is presented to the users), change how or when messages (such as update emails) are sent to the users (and, more generally, how information flows among the users, which may allow the flows to be optimized by determining which users have the most influence on other users in the social graph), etc. In turn, these changes may improve revenue and/or profit of the business associated with the social graph (such as the provider of the website), and/or the indirect component itself (i.e., engagement with the website). Therefore, the improved metric may include the revenue and/or profit of the business, and/or the indirect component.

In some embodiments of method 100 (FIGS. 1 and 2), there may be additional or fewer operations. Moreover, the order of the operations may be changed, and/or two or more operations may be combined into a single operation.

In an exemplary embodiment, the monitoring technique is used to assess the downstream or viral impact of users' actions in a social graph associated with a website (which is sometimes referred to as 'virality'). Note that a 'viral action' is an action by a given user that results in a cascading effect of downstream engagement by other users in response to the given user's action. As such, a viral action has a multiplicative effect in the social graph. For example, a user that accepts an invitation to connect or establish a relationship in the social graph with another user may, in turn, invite additional users to establish a connection. Thus, the impact of the original (initial) invitation includes the acceptance by the user plus the invitations sent to the additional users (which, respectively, contribute to the direct component and the indirect component).

This approach for tracking or assessing the impact of user actions may provide a more holistic or inclusive view of the impact. For example, instead of concluding that 100 users accessed or interacted with the website in response to a message based on page views of the message (which may be the direct component), by looking at subsequent actions that occur in response to the message over several days, the monitoring technique may determine that 125 users accessed or interacted with the website (which includes the direct component and the indirect component).

Similarly, the providers of websites often attempt to assess the impact of a change (such as to the layout) by dividing a user population into two groups or cohorts (which is sometimes referred to as 'AB experimentation'). One group is a control group who does not see a proposed change and the other is an experimental group that does see the change. The suitability of the change may be assessed by looking at the impact. For example, group A may have page views (or views of a document, such as a web page) that total 6, while group B may have also 6 page views. Thus, it may appear that the change has no impact. However, by determining and including the viral impact (i.e., the indirect component), group B may have actually have 9 page views (6 for the direct component and 3 for the indirect component), an increase of 50%. Therefore, the monitoring technique may provide more accurate information, which can be used to make decisions.

In order to determine the direct component and the indirect component of the impact of a user's action, the linkages specifying the origins or initiators of the action may need to be tracked by a logging infrastructure associated with the website. For example, the logging infrastructure may track direct user actions, and may include information specifying what the direct user actions were in response to (such as particular emails that were received from other users). In addition to tracking the user actions and the linkages, as discussed further below, the viral nature of a given user's action may be determined by a model (such as by fitting data from a previous 3 weeks to a geometric series) when looking at longer periods of data are not possible (e.g., because of data retention policies) and/or practical (e.g., because of processing constraints). This approach is also possible because the model may be fairly stable when short, fixed time intervals of data (such as 3 weeks) are used to train the model.

Figure 3:
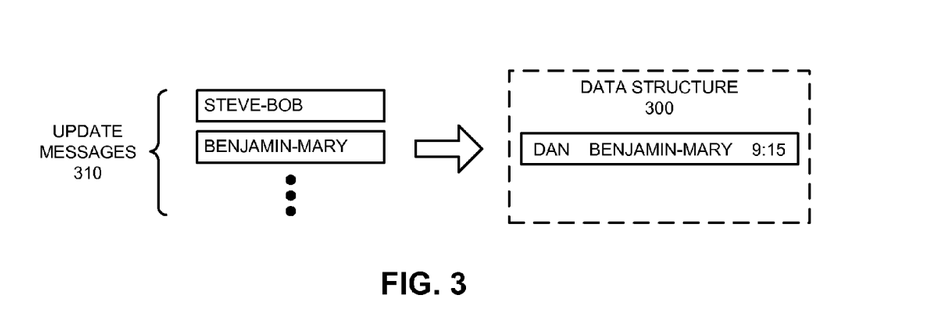
FIG. 3 is a drawing illustrating a data structure in accordance with an embodiment of the present disclosure.

A variety of techniques may be used in the logging infrastructure. In one approach, direct measures of users' actions (but which do not account for downstream or viral effects), such as user clicks on messages, may be tracked and heuristics or rules may be used to estimate the cause and effect (i.e., the viral effect) of a given message in a time interval (such as a week). This is shown in FIG. 3, which presents a drawing illustrating a data structure 300 that tracks user actions. In particular, update messages 310 that indicate developments in the careers of users of the website over time may be sent by the website to users. For example, update messages 310 may indicate new connections between users in the social graph, such as a connection between Steve and Bob, or Benjamin and Mary. Dan may activate or click on a link for the update message showing the connection between Benjamin and Mary. Data structure 300 may log that Dan activated the link showing the connection between Benjamin and Mary at a particular timestamp.

However, in subsequent analysis of data structure 300, the only information available is that Dan activated the link at a particular time. There is no information about the original or initial update messages 310. In principle, information about the origin or initiator of Dan's action may be obtained by looking at all of Dan's clicks in a particular time interval. Then, these clicks can be associated or linked with different types of messages provided by the website (such as update messages 310, emails from one user to another, etc.), as well as identifiers of the users in an attempt to reconstruct cause and effect (and, thus, to estimate the indirect component).

Figure 4:
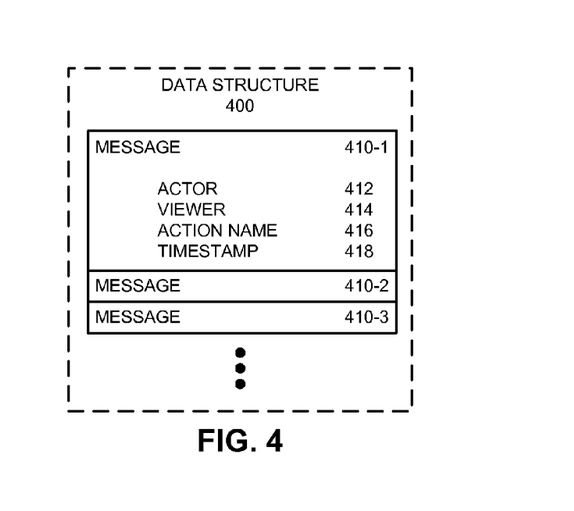
FIG. 4 is a drawing illustrating a data structure that aggregates information specifying multiple users' actions in accordance with an embodiment of the present disclosure.

Alternatively, the logging infrastructure may aggregate the information needed to determine the direct component and the indirect component in a data structure. This is shown in FIG. 4, which presents a drawing illustrating a data structure 400 that aggregates information specifying multiple users' actions. In particular, data structure 400 may indicate: a message 410-1, an actor 412 (such as the user, Benjamin, who sent an invitation email that resulted in a connection in the social graph with Mary), a viewer 414 (such as Dan, who opened the update message), an action name 416 (which may indicate that message 410-1 is an update message), and a timestamp 418.

Collectively, data structure 400 may include information about longitudinal actions over time with the linkages between the actions of the users (as opposed to only including the actions of the users) so that cause and effect (i.e., the direct and indirect components) can be determined. For example, data structure 400 may indicate why a user received an email and the user(s) that generated the content. This may allow the virality or downstream effect to be assessed (such as the impact or 'value' of a particular message or email). Thus, data structure 400 may provide a comprehensive view of the downstream affect or impact of a particular user's actions, which may allow the dynamic influence of the users in the social graph to be assessed, and which may allow the most influential users (from an information-flow perspective) in the social graph to be identified.

Figure 5:
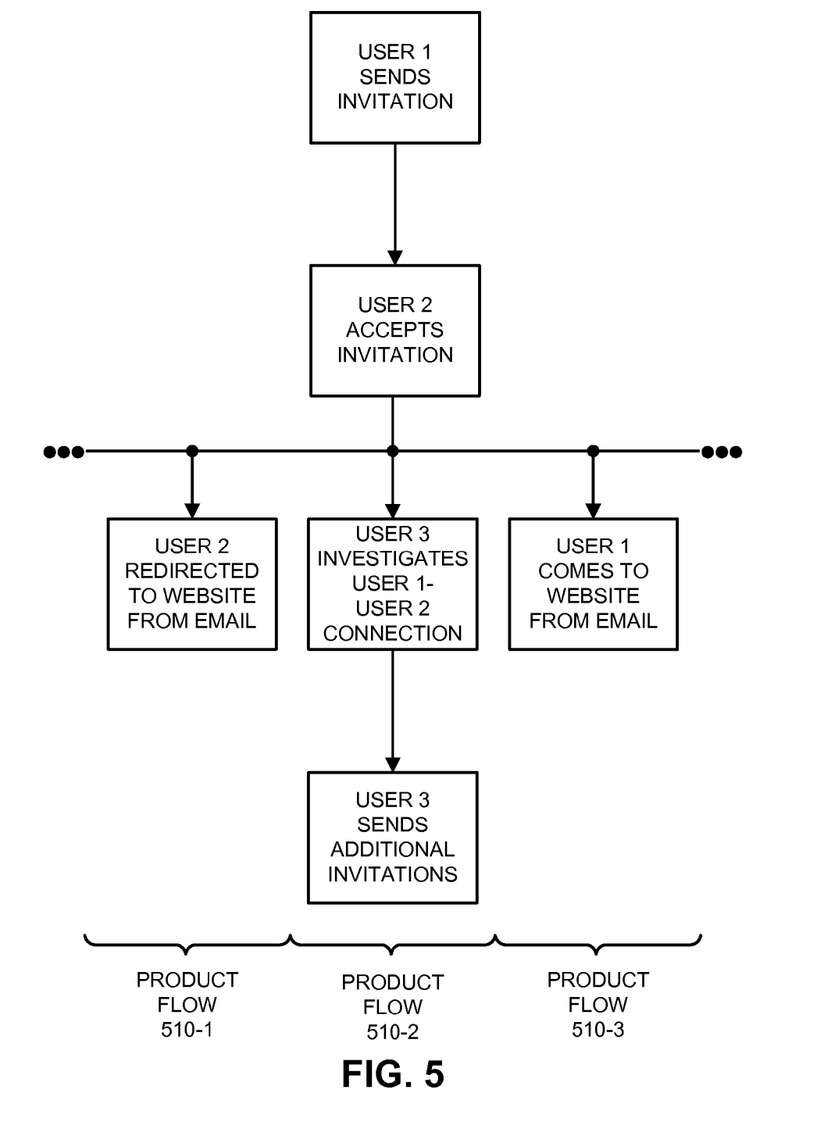
FIG. 5 is a drawing illustrating product flows for member invitations in accordance with an embodiment of the present disclosure.

As noted previously, the indirect component may, at least in part, be estimated using fits of different flows of information in the social graph to models (such as fits to equations, functions or, more generally, supervised learning models that predict different flows of information based on the direct component and the indirect component). This is shown in FIG. 5, which presents a drawing illustrating product flows 510 for member invitations. In product flow 510-2 for member invitations to connect or establish a relationship with each other in the social graph, user 1 sends an invitation to user 2. Based on historical data, there is a probability $P_1$ of 23% that user 2 accepts this invitation. Moreover, there is a probability $P_2$ of 9% that user 3 sees this new connection in an update message or on their homepage and clicks on it. Furthermore, there is a probability $P_3$ of 1% that user 3 sends additional invitations to other users in the social graph in response. The response (or subsequent actions) to these additional invitations (such as page views of the website) may be modeled using a model fit to a memory-less model, such as a geometric series. (In general, there may be different models for different product flows 510.) In particular, the response to the additional invitations from user 3 may be $$\frac{M}{1-r},$$

where r equals $P_1 \cdot P_2 \cdot P_3$ (i.e., 0.000207) and M is a multiplicative factor (such as 3.4865) that represents the average number of page views to the website in response to the additional invitations. Note that M and r may be determined from analysis of all member invitation messages and associated page views of product flow 510-2 over one or more days, one or more weeks, or one or more months. In an exemplary embodiment, the website has 200M total members and 40M monthly users. There are 18M member invitations per week that result in 75-100M clicks or page views on the website. In some alternative embodiments, actions of a subset of all members (e.g., invitation messages and associated page views) are analyzed, such as a particular group or community of members.

Figure 6:
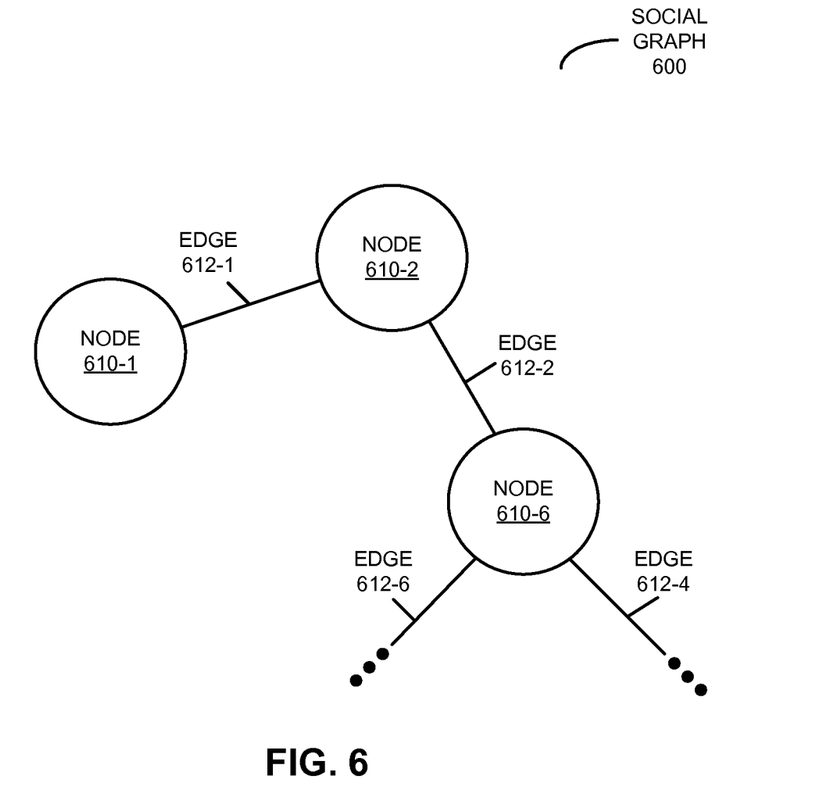
FIG. 6 is a drawing illustrating a social graph in accordance with an embodiment of the present disclosure.

We now further describe the social graph. As noted previously, the profiles of the individuals, their attributes, associated organizations (or entities) and/or the interrelationships (or connections) may specify a social graph. FIG. 6 presents a drawing illustrating a social graph 600. This social graph may represent the connections or interrelationships among nodes 610 (corresponding to individuals, attributes of the individuals, entities, etc.) using edges 612. In the context of the monitoring technique, the individuals or users may correspond to one or more of nodes 610, and these individual(s) may be connected to other nodes 610 by edges 612. More generally, nodes 610 may be associated with attributes of the individuals (such as skills), business information (such as contact information) and/or entities that the individuals are associated with (such as companies, schools, organizations, etc.). Thus, multiple individuals may be associated with a given one of nodes 610. In this way, social graph 600 may specify the business information, and may indicate interrelationships or connections between the individuals and organizations.

Figure 7:
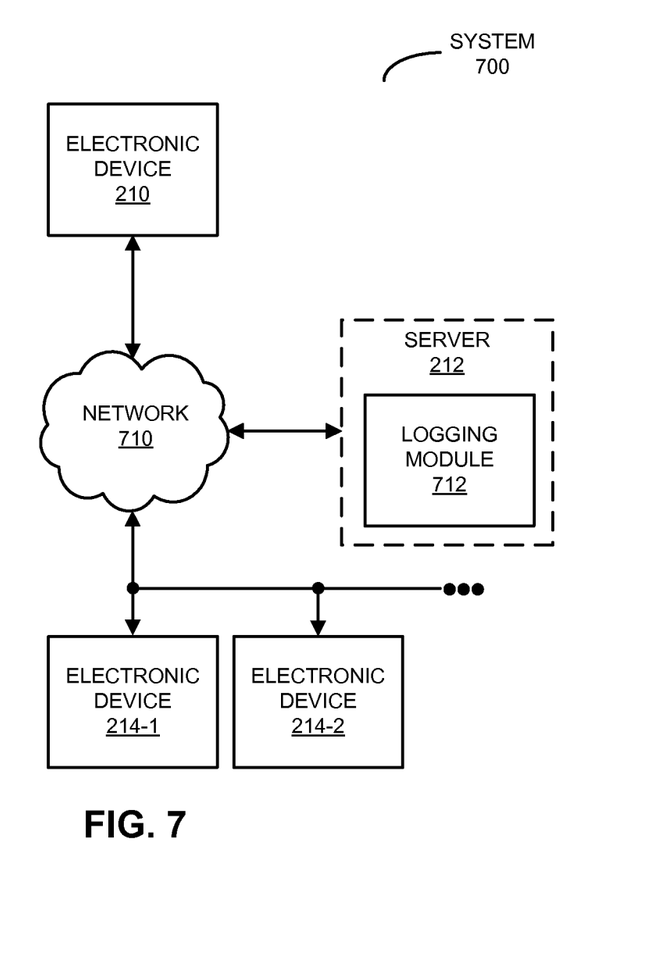
FIG. 7 is a block diagram illustrating a system that performs the method of FIGS. 1 and 2 in accordance with an embodiment of the present disclosure.

We now describe embodiments of the system and the computer system, and their use. FIG. 7 presents a block diagram illustrating a system 700 that performs method 100 (FIGS. 1 and 2). In this system, a user of electronic device 210 may use a software product, such as a software application that is resident on and that executes on electronic device 210.

Alternatively, the user may interact with a web page that is provided by server 212 via network 710, and which is rendered by a web browser on electronic device 210. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on electronic device 210 (such as a software application that is provided by server 212 or that is installed and which executes on electronic device 210).

As discussed previously, the user may use the software application when the user is interacting with a website hosted by server 212. When the user performs an action, such as clicking on a link in an update message, electronic device 210 may provide information about the action to server 212 via network 710. In response to the user clicking on the link, server 212 may also perform additional operations, such as providing messages to one or more of the users of electronic devices 214 via network 710. For example, server 212 may provide invitation messages or emails or update messages about the user to the users. Similarly, the users of electronic devices 214 may use instances of the software application when the users are interacting with the website. When the users perform actions, electronic devices 214 may provide information about the actions to server 212 via network 710.

Server 212 may aggregate the information received from electronic devices 210 and 214. For example, a logging module 712 may store the information along with linkages that indicate the initiators or origins of the users' actions that are related to a particular user's action, such as the user of electronic device 210 clicking on the link in the update message.

Then, server 212 may determine the impacts of the multiple users' actions based on the aggregated information. For example, server 212 may determine the direct component and the indirect component of the impact associated with the user of electronic device 210 clicking on the link in the update message.

In some embodiments, server 212 optionally uses the determined direct and indirect components of impacts of one or more of the users' actions to improve the metric associated with the users' actions.

Note that information in system 700 may be stored at one or more locations in system 700 (i.e., locally or remotely). Moreover, because this data may be sensitive in nature, it may be encrypted. For example, stored data and/or data communicated via network 710 may be encrypted.

Figure 8:
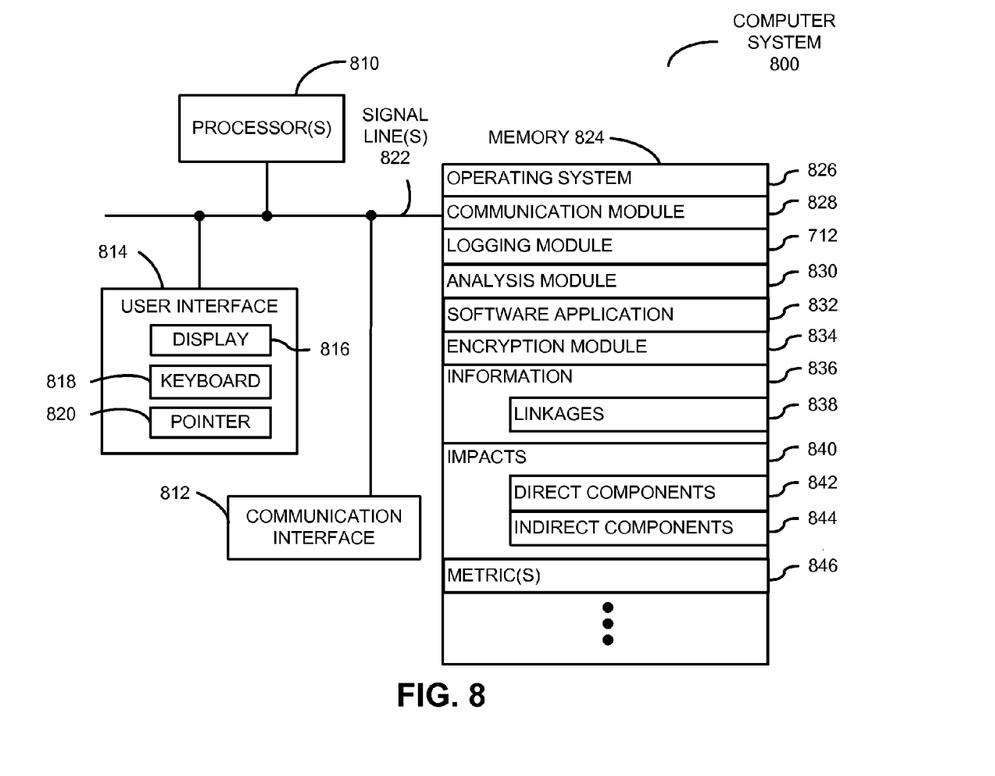
FIG. 8 is a block diagram illustrating a computer system that performs the method of FIGS. 1 and 2 in accordance with an embodiment of the present disclosure.

FIG. 8 presents a block diagram illustrating a computer system 800 that performs method 100 (FIGS. 1 and 2). Computer system 800 includes one or more processing units or processors 810, a communication interface 812, a user interface 814, and one or more signal lines 822 coupling these components together. Note that the one or more processors 810 may support parallel processing and/or multi-threaded operation, the communication interface 812 may have a persistent communication connection, and the one or more signal lines 822 may constitute a communication bus. Moreover, the user interface 814 may include: a display 816 (such as a touchscreen), a keyboard 818, and/or a pointer 820, such as a mouse.

Memory 824 in computer system 800 may include volatile memory and/or non-volatile memory. More specifically, memory 824 may include: ROM, RAM, EPROM, EEPROM, flash memory, one or more smart cards, one or more magnetic disc storage devices, and/or one or more optical storage devices. Memory 824 may store an operating system 826 that includes procedures (or a set of instructions) for handling various basic system services for performing hardware-dependent tasks. Memory 824 may also store procedures (or a set of instructions) in a communication module 828. These communication procedures may be used for communicating with one or more computers and/or servers, including computers and/or servers that are remotely located with respect to computer system 800.

Memory 824 may also include multiple program modules (or sets of instructions), including: logging module 712 (or a set of instructions), analysis module 830 (or a set of instructions), software application 832 (or a set of instructions) and/or encryption module 834 (or a set of instructions). Note that one or more of these program modules (or sets of instructions) may constitute a computer-program mechanism.

During operation, logging module 712 receives user actions when the users are using software application 832, via communication interface 812 and communication module 828, and aggregates information 836 about the actions. This information may include linkages 838 that indicate the initiators or origins of the users' actions.

Then, analysis module 830 determines impacts 840 of the multiple users' actions based on aggregated information 836. In particular, impacts 840 include direct components 842 and indirect components 844 associated with the users' actions.

In some embodiments, analysis module 830 optionally uses determined direct components 842 and/or indirect components 844 for one or more of the users' actions to improve one or more metrics 846 associated with one of more of the users' actions.

Because information in computer system 800 may be sensitive in nature, in some embodiments at least some of the data stored in memory 824 and/or at least some of the data communicated using communication module 828 is encrypted using encryption module 834.

Instructions in the various modules in memory 824 may be implemented in: a high-level procedural language, an object-oriented programming language, and/or in an assembly or machine language. Note that the programming language may be compiled or interpreted, e.g., configurable or configured, to be executed by the one or more processors.

Although computer system 800 is illustrated as having a number of discrete items, FIG. 8 is intended to be a functional description of the various features that may be present in computer system 800 rather than a structural schematic of the embodiments described herein. In practice, and as recognized by those of ordinary skill in the art, the functions of computer system 800 may be distributed over multiple servers or computers, with various groups of the servers or computers performing particular subsets of the functions. In some embodiments, some or all of the functionality of computer system 800 is implemented in one or more application-specific integrated circuits (ASICs) and/or one or more digital signal processors (DSPs).

Computer systems (such as computer system 800), as well as electronic devices, computers and servers in system 700 (FIG. 7) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 710 (FIG. 7) may include: the Internet, World Wide Web (WWW), an intranet, a cellular-telephone network, LAN, WAN, MAN, or a combination of networks, or other technology enabling communication between computing systems.

Data structure 400 (FIG. 4), system 700 (FIG. 7) and/or computer system 800 may include fewer components or additional components. Moreover, two or more components may be combined into a single component, and/or a position of one or more components may be changed. In some embodiments, the functionality of system 700 (FIG. 7) and/or computer system 800 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for determining a total cumulative impact of a user action made while accessing an online social network, the method comprising:
 aggregating, via a logging infrastructure, information specifying the user action into a set of one or more data structures, wherein each data structure includes at least one linkage, wherein a linkage links a first user action with a second user action in order to indicate that the first user action caused the second user action, thereby enabling the computer system to follow one or more sequences of causally linked user actions that have occurred;
 determining, by computer, a direct impact of the user action;
 determining an indirect impact of the user action by:
  using the one or more sequences to gather a set of future user actions that may occur, wherein each future user action would occur in response to the user action;
  for each future user action, calculating a probability of the future user action occurring; and
  calculating the indirect impact by using the calculated probabilities to model the set of future user actions; and
 wherein the social graph includes relationships between users in the online social network.

2. The method of claim 1, wherein the impact of the user action is determined as a function of time following the user action.

3. The method of claim 1, wherein a formation of at least some of the relationships precede the user action.

4. The method of claim 1, wherein a formation of at least some of the relationships occur following the user action.

5. The method of claim 1, wherein each calculated probability is multiplied by a multiplicative factor; and
 wherein the multiplicative factor corresponds to a number of page views associated with an action in the sequence of causally linked user actions.

6. The method of claim 1, wherein the direct impact includes one of: an endorsement, an invitation to establish a relationship, an edit to a profile associated with another user, a follow to an update to another user in the social graph, and a follow to an update to an organization associated with another user in the social graph.

7. The method of claim 1, wherein the indirect impact includes one of: a view of a document after the user action, a number of unique users of the social graph after the user action, a revenue of a business associated with the social graph after the user action, and a number of actions after the user action.

8. The method of claim 1, wherein the method further comprises improving a metric associated with the user action based on the determined impacts.

9. The method of claim 8, wherein the metric includes one of: a profit of a business associated with the social graph, a flow of information among the users, and the indirect impact.

10. A computer-program product for use in conjunction with a computer, the computer-program product comprising a non-transitory computer-readable storage medium and a computer-program mechanism embedded therein, to determine a total cumulative impact of a user action made while accessing an online social network, the computer-program mechanism including:

instructions for aggregating, via a logging infrastructure, information specifying the user action into a set of one or more data structures, wherein each data structure includes at least one linkage, wherein a linkage links a first user action with a second user action in order to indicate that the first user action caused the second user action, thereby enabling the computer system to follow one or more sequences of causally linked user actions that have occurred;

instructions for determining, by computer, a direct impact of the user action; and instructions for determining an indirect impact of the user action by:

using the one or more sequences to gather a set of future user actions that may occur, wherein each future user action would occur in response to the user action;

for each future user action, calculating a probability of the future user action occurring; and calculating the indirect impact by using the calculated probabilities to model the set of future user actions; and wherein the social graph includes relationships between users in the online social network.

11. The computer-program product of claim 10, wherein the impact of the user action is determined as a function of time following the user action.

12. The computer-program product of claim 10, wherein a formation of at least some of the relationships precede the user action.

13. The computer-program product of claim 10, wherein a formation of at least some of the relationships occur following the user action.

14. The computer-program product of claim 10, wherein the direct impact of the impact includes one of: an endorsement, an invitation to establish a relationship, an edit to a profile associated with another user, a follow to an update to another user in the social graph, and a follow to an update to an organization associated with another user in the social graph.

15. The computer-program product of claim 10, wherein the indirect impact corresponds to one of: a view of a document after the user action, a number of unique users of the social graph after the user action, a revenue of a business associated with the social graph after the user action, and a number of actions after the user action.

16. The computer-program product of claim 10, wherein the computer-program mechanism further includes instructions for improving a metric associated with the user action based on the determined impacts.

17. The computer-program product of claim 16, wherein the metric includes one of: a profit of a business associated with the social graph, a flow of information among the users, and the indirect impact.

18. A computer, comprising:

a processor;

memory; and a program module, wherein the program module is stored in the memory and configurable to be executed by the processor to determine a total cumulative impact of a user action made while accessing an online social network, the program module including:

instructions for aggregating, via a logging infrastructure, information specifying the user action into a set of one or more data structures, wherein each data structure includes at least one linkage, wherein a linkage links a first user action with a second user action in order to indicate that the first user action caused the second user action, thereby enabling the computer system to follow one or more sequences of causally linked user actions that have occurred;

instructions for determining, by computer, a direct impact of the user action; and instructions for determining an indirect impact of the user action by:

using the one or more sequences to gather a set of future user actions that may occur, wherein each future user action would occur in response to the user action;

for each future user action, calculating a probability of the future user action occurring; and calculating the indirect impact by using the calculated probabilities to model the set of future user actions; and wherein the social graph includes relationships between users in the online social network.

* * * * *